(12) United States Patent
Coenen et al.

(10) Patent No.: US 6,659,192 B2
(45) Date of Patent: Dec. 9, 2003

(54) HYDRAULIC LIFT DEVICE FOR AN ATTACHING DEVICE

(75) Inventors: Herbert Coenen, Konigswinter (DE); John Sayer, Shropshire (GB)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 10/152,504

(22) Filed: May 21, 2002

(65) Prior Publication Data

US 2002/0195258 A1 Dec. 26, 2002

(30) Foreign Application Priority Data

May 28, 2001 (DE) .......................... 101 26 029

(51) Int. Cl.$^7$ .............................................. A01B 63/10
(52) U.S. Cl. .............................. 172/439; 172/7; 91/520
(58) Field of Search ............................. 172/2, 3, 4, 4.5, 172/7, 8, 436, 440, 441, 442, 445, 439; 414/636; 187/274, 275; 91/515, 514, 520, 516; 280/446.1, 449, 477, 478.1, 479.1; 60/424

(56) References Cited

U.S. PATENT DOCUMENTS

| | | | | |
|---|---|---|---|---|
| 3,476,016 A | * | 11/1969 | Dixon ........................ 91/520 |
| 4,166,506 A | * | 9/1979 | Tezuka et al. ................ 172/4.5 |
| 4,510,849 A | * | 4/1985 | Khramtsov et al. ............ 91/515 |
| 4,741,413 A | * | 5/1988 | Kishi ........................ 187/244 |
| 5,335,499 A | * | 8/1994 | Thompson et al. ........... 91/520 |
| 5,520,443 A | * | 5/1996 | Zanzig ........................ 91/520 |
| 6,230,817 B1 | * | 5/2001 | Haugen ...................... 172/439 |
| 6,253,859 B1 | * | 7/2001 | Coenen ...................... 172/448 |
| 6,378,301 B2 | * | 4/2002 | Endo et al. .................... 60/414 |

FOREIGN PATENT DOCUMENTS

| | | |
|---|---|---|
| DE | 87 04 278.9 | 8/1987 |
| GB | 2376403 A | * 12/2002 |

* cited by examiner

*Primary Examiner*—Robert E. Pezzuto
*Assistant Examiner*—Nathan Mammen
(74) *Attorney, Agent, or Firm*—Harness, Dickey & Pierce, P.L.C.

(57) ABSTRACT

A hydraulic lift device for an attaching device of a tractor which has a hydraulic pressure supply device and a hydraulic tank, comprising for each of two lower steering arms, a double acting hydraulic cylinder having a cylinder housing, a piston rod, a piston with a piston-end piston area and a piston rod-end piston area, as well as a piston-end cylinder chamber and a piston rod-end cylinder chamber. The device further comprises a first switching valve, which has at least three switching positions and four ports. The first port represents a connection to the pressure supply device. The second port represents the connection to the hydraulic tank. The third port represents the connection to the piston-end cylinder chamber of the first hydraulic cylinder and the fourth port represents the connection to the piston rod-end cylinder chamber of the second hydraulic chamber. The piston rod-end cylinder chamber of the first hydraulic cylinder is connected via a line to the piston-end cylinder chamber of the second hydraulic cylinder. The piston rod-end piston area of the first hydraulic cylinder and the piston-end piston area of the second hydraulic cylinder have the same size or a predetermined size relationship to each other.

9 Claims, 3 Drawing Sheets

HYDRAULIC LIFT DEVICE FOR AN ATTACHING DEVICE

CROSS-REFERENCE TO RELATED APPLICATIONS

This application claims the benefit of German Patent Application No. 10126029.6, filed on May 28, 2001.

FIELD OF THE INVENTION

The present invention relates to a hydraulic lift device for an attaching device of a tractor, a self-propelled working machine or an implement having a hydraulic pressure supply device and a hydraulic tank.

BACKGROUND OF THE INVENTION

WO/96 03024 describes a hydraulic lift device for an attaching device, in which each lower steering arm is controlled by a separate hydraulic cylinder. Both hydraulic cylinders are connected to the pressure supply device by a switching valve. This enables the lower steering arms to be lifted jointly. The hydraulic cylinders can be connected together to the hydraulic tank. As the lowering operation of the hydraulic cylinders is caused by their own weight, a synchronized lowering operation of both hydraulic cylinders cannot be ensured, especially when the lower steering arms are loaded differently.

DE 199 39 967 A1 describes a lift device for an attaching device of a tractor, in which each lower steering arm is controlled by a separate hydraulic cylinder. A positioning recorder produces a positioning signal representing the respective pivot position of each of the lower steering arms. A control circuit is provided to achieve synchronized movement of both hydraulic cylinders. The control circuit balances the hydraulic cylinders when the positioning recorder indicates a difference between the pivot positions of the steering arms. The electronic control employed by the control circuit is cumbersome and too expensive to apply to situations which do not require such a high degree of accuracy.

DE 87 04 278 U1 discloses a hydraulic circuit for controlling the side struts of the lower steering arms of a narrow-gauge tractor. Each lower steering arm has a double acting hydraulic cylinder which allows each arm to be pivoted laterally. The hydraulic circuit has a switching position which connects one of the hydraulic cylinders to the pressure supply and actuates the other hydraulic cylinder by displacing a pressure liquid volume. To accomplish this, the piston-end cylinder chamber of one of the hydraulic cylinders is connected to the piston rod-end cylinder chamber of the other hydraulic cylinder. The volume difference displaced when the circuit is in a first switching position causes a difference in piston travel in hydraulic cylinders of the same size. The hydraulic circuit has another switching position which allows for opposed movement of the two hydraulic cylinders. This results in different adjustment paths for each lower steering arm and which is desired only under special working conditions.

SUMMARY OF THE INVENTION

It is an object of the present invention to provide a hydraulic lift device for an attaching device which simply synchronizes the adjustment of the lower steering arms. This may be achieved by a specific advance or lagging of one hydraulic cylinder with respect to the other. It is also possible to achieve this synchronization at different lifting positions of the lower steering arms.

This object is achieved by the hydraulic lift device of the present invention. The hydraulic lift device comprises a first double acting hydraulic cylinder for actuating one of two lower steering arms. The first double acting hydraulic cylinder has a first cylinder housing, a first piston rod and a first piston. The first piston includes a first piston-end piston area and a first piston rod-end piston area. The first double acting hydraulic cylinder further includes a first piston-end cylinder chamber and a first piston rod-end cylinder chamber. The hydraulic lift device of the present invention further comprises a second double acting hydraulic cylinder for actuating the other of the two lower steering arms. The second double acting hydraulic cylinder has a second cylinder housing, a second piston rod and a second piston. The second piston includes a second piston-end piston area and a second piston rod-end piston area. The second double acting hydraulic cylinder also has a second piston-end cylinder chamber and a second piston rod-end cylinder chamber.

The hydraulic lift device of the present invention further comprises a first switching valve which is adapted to take up at least three switching positions and is comprised of four ports. The first port represents the connection to the pressure supply device. The second port represents the connection to the hydraulic tank. The third port represents the connection to the first piston-end cylinder chamber of the first hydraulic cylinder. The fourth port represents the connection to the second piston rod-end cylinder chamber of the second hydraulic cylinder.

The present invention further includes a line connecting the first piston rod-end cylinder chamber of the first hydraulic cylinder to the second piston-end cylinder chamber of the second hydraulic cylinder. The first piston rod-end piston area of the first hydraulic cylinder and the second piston-end piston area of the second hydraulic cylinder have the same size or a specific predetermined size relationship to each other.

Finally, the hydraulic lift device of the present invention further comprises a second switching valve which is arranged in line between the first piston rod-end cylinder chamber of the first hydraulic cylinder and the second piston-end cylinder chamber of the second hydraulic cylinder. The second switching valve is adapted to take up a basic position and at least two further switching positions. The second switching valve comprises a first port for the pressure supply device and a second port for the hydraulic tank. In the basic position, the connection to the pressure supply device and to the hydraulic tank, as well as to a fifth port to the second piston rod-end cylinder chamber of the second hydraulic cylinder are closed. The third and the fourth port are open to the line between the first piston rod-end cylinder chamber and the second piston-end cylinder chamber.

The present invention is advantageous because a synchronization or an advance or lagging of a hydraulic cylinder can be achieved in a purely hydraulic manner. To achieve this, the first piston of the first hydraulic cylinder, having a pressurized first piston-end cylinder chamber, pressurizes the second piston end cylinder chamber of the second hydraulic cylinder and displaces a proportional volume from the first piston rod-end cylinder chamber. When the second piston-end piston area of the second hydraulic cylinder is as large as the first piston rod-end piston area of the first hydraulic cylinder, the volume displaced from the first piston rod-end cylinder chamber will lead to an adjustment of the second piston in the second cylinder housing by the same volume. Specific measuring devices are not necessary to accomplish this synchronization. A specific advance or lagging of one of the hydraulic cylinders can be achieved as a result of the volume difference and the predetermined size relationship between the hydraulic cylinders. This can be advantageous in situations where leakages appear, as the advancing cylinder first reaches the end position in the cylinder housing when a pressure limitation is given. The other cylinder can also reach the end position to be able to correct for length differences which result from leakages.

As both cylinder chambers are filled with pressurized liquid, a further advantage is a stabilization of the lower steering arms during an eccentrically loading operation. This advantage is achieved when the first switching valve takes up the closed position. An adjustment of only one lower steering arm can also be achieved for situations when it is necessary to balance transversal inclinations or when the design of a device requires adjustment. During further normal lifting operations, the two lower steering arms continue to move in synchronization.

In a further embodiment of the present invention, concerning the first switching valve lines are provided for the passage of a pressure means. Specifically, pressure is exchanged between the first port and the pressure supply device, between the second port and the hydraulic tank, between the third port and the first piston-end cylinder chamber and between the fourth port and the second piston rod-end cylinder chamber. The first switching valve is able to take up a first switching position, in which all the ports are closed. The first switching valve is also able to take up a second switching position, in which the pressure supply device is connected to the first piston-end cylinder chamber and the second piston rod-end cylinder chamber is connected to the hydraulic tank. Finally, the first switching valve is able to take up a third switching position in which the pressure supply device is connected to the second piston rod-end cylinder chamber and the first piston end cylinder chamber is connected to the hydraulic tank.

In a further embodiment of the present invention, the second switching valve is switchable to a first further switching position, thereby (1) closing the connection to the first piston rod-end cylinder chamber of the first hydraulic cylinder, (2) connecting the second piston-end cylinder chamber of the second hydraulic cylinder to the pressure supply device and (3) connecting the second piston end cylinder chamber of the second hydraulic cylinder to the hydraulic tank. The second switching valve is switchable to a second further switching position, thereby (1) closing the connection to the first piston rod-end cylinder chamber of the first hydraulic cylinder, (2) connecting the second piston-rod-end cylinder chamber of the second hydraulic cylinder to the pressure supply device and (3) connecting the second piston rod-end cylinder chamber of the second hydraulic cylinder to the hydraulic tank.

The lower steering arms can also take up a floating position, i.e., both are freely adjustable in height relative to their pivoting position around their pivoting axis. To achieve this, the first switching valve is switchable to a fourth switching position, thereby (1) connecting the first piston-end cylinder chamber of the first hydraulic cylinder and the second piston rod-end cylinder chamber of the second hydraulic cylinder to the hydraulic tank and (2) closing the first port to the pressure supply device. The second switching valve is switchable to a third further switching position, thereby (1) closing the first port to the pressure supply device, (2) closing the fifth port to the second piston rod-end cylinder chamber of the second hydraulic cylinder and (3) connecting the first piston rod-end cylinder chamber of the first hydraulic cylinder and the second piston-end cylinder chamber of the second hydraulic cylinder to the hydraulic tank. The cylinder chambers of both hydraulic cylinders are resultingly connected to the hydraulic tank and a pressure means is exchanged.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
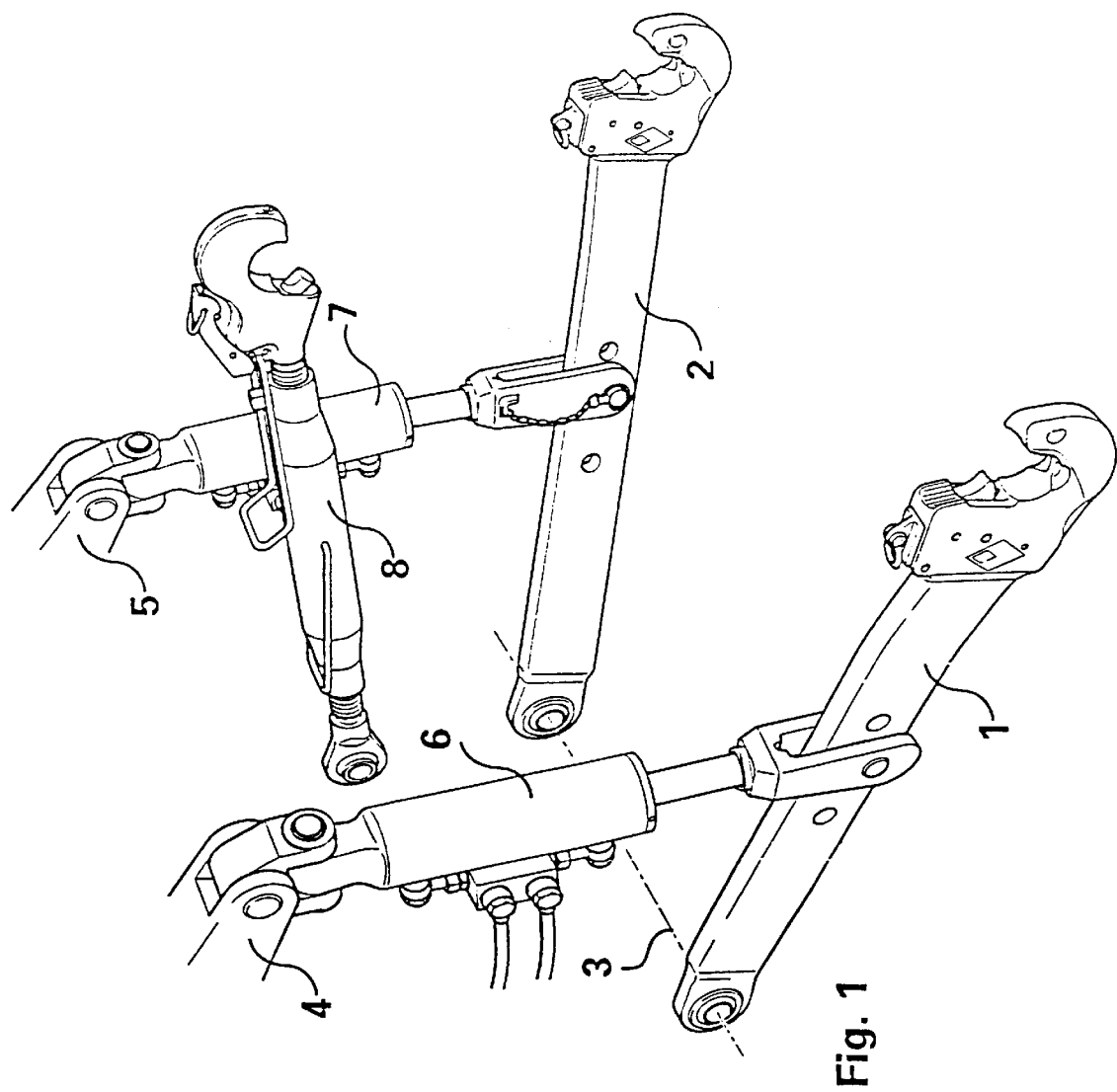
FIG. 1 is a perspective view of a first embodiment of the hydraulic lift device of the present invention.

FIG. 1 shows a first embodiment of a hydraulic lift device for a three-point attachment device. Both lower steering arms 1, 2, are visible. The lower steering arms 1, 2, are arranged around a common pivoting axis 3 on the rear end of a tractor (not shown). Two brackets 4, 5 are located on the rear end of the tractor above the pivoting means which forms the pivoting axis 3. A first hydraulic cylinder 6, having a cylinder housing, is attached to the bracket. A piston rod leads out of the cylinder housing of the first hydraulic cylinder 6. The piston rod is attached to the lower steering arm 1 at a distance from the pivoting axis 3. Correspondingly, in reference to the lower steering arm 2, a second hydraulic cylinder 7 has a piston rod which is attached to the lower steering arm 2. The housing of the second hydraulic cylinder is attached to the bracket 5. The two lower steering arms 1, 2 are arranged at a distance from each other along the pivoting axis 3. A top link 8 is pivotably mounted on the rear end of the tractor at a position above and centered between the two lower steering arms 1, 2. The above described components together form the three-point attachment device.

As the piston rods of the two hydraulic cylinders 6, 7 are extended from their corresponding cylinder housings, the lower steering arms 1, 2 are pivotably lowered around the pivoting axis 3. As the piston rods are retracted into the cylinder housings of the two hydraulic cylinders 6, 7 the two lower steering arms 1, 2 are pivotably lifted around the pivoting axis 3.

Figure 2:
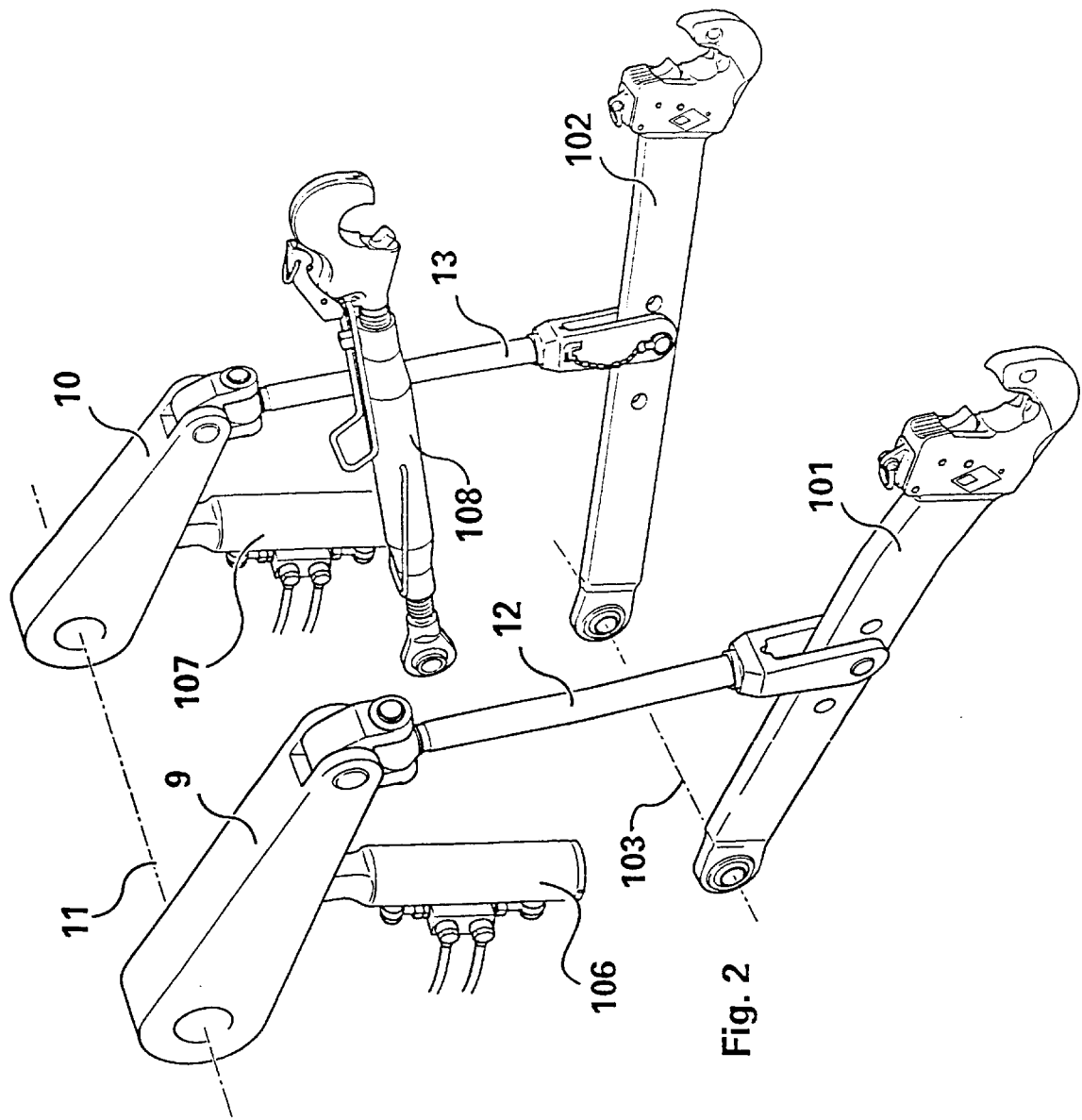
FIG. 2 is a perspective view of an alternative embodiment of the hydraulic lift device of the present invention.

FIG. 2 shows an alternative embodiment of the hydraulic lift device of the present invention. The two lower steering arms 101, 102 of this embodiment are also arranged pivotably around a pivoting axis 103. Lift arms 9, 10 are located on the rear end of a tractor (not shown), above the two lower steering arms 101, 102. Lift arms 9, 10 are arranged pivotably around the lift arm axis 11. The first lift arm 9 is connected to the lower steering arm 101 by means of a first lifting strut 12. The second lift arm 10 is connected to the second lower steering arm 102 by means of the second lifting strut 13. A first hydraulic cylinder 106 is connected to the first lift arm 9 and a second hydraulic cylinder 107 is connected to the second lift arm 10. The first hydraulic cylinder 106 and the second hydraulic cylinder 107 are supported on one end by the rear end of the tractor and on the other end by lift arm 9 and 10, respectively. A top link 108 is also provided, similarly to top link 8 of the first embodiment as shown in FIG. 1.

The control of the hydraulic cylinders 6, 7 or 106, 107 of either embodiment is described in detail with reference to FIG. 3. The only difference between the embodiments shown in FIGS. 1 and 2 exists in the operation of the hydraulic lift device. The lifting operation of the lower steering arms 1, 2 of FIG. 1 is achieved by retracting the piston rods into the corresponding cylinder housing of the two hydraulic cylinders 6, 7. In contrast, the lifting operation of the lower steering arms 101, 102 of FIG. 2 is achieved by extending the piston rods from the corresponding cylinder housings of the two hydraulic cylinders 106, 107.

As the hydraulic circuit employed by the devices shown in FIGS. 1 and 2 is the same, description of the hydraulic circuit of FIG. 3 will be made with reference to the numerals of FIG. 1 only.

Figure 3:
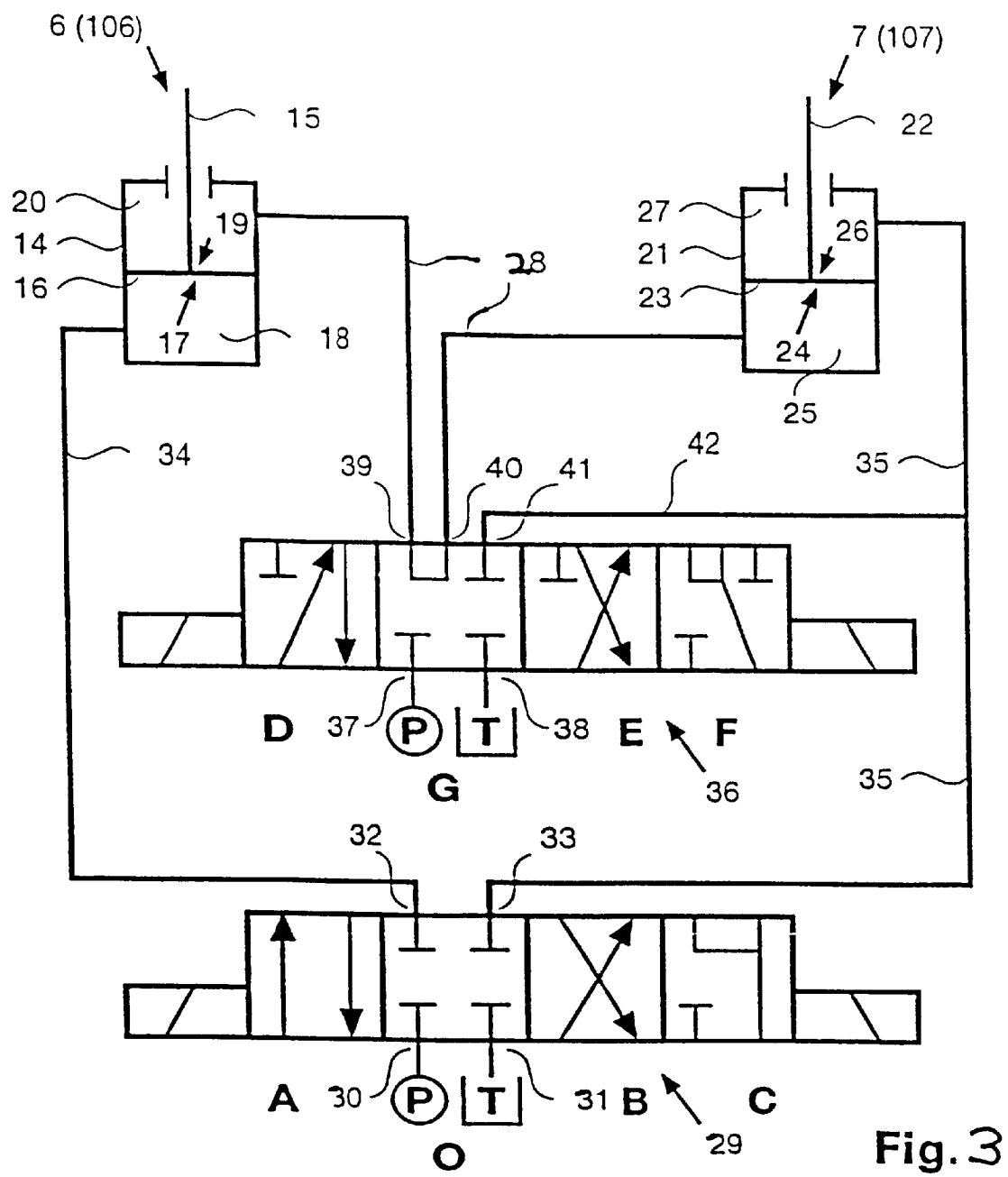
FIG. 3 is a view of a hydraulic circuit layout of the present invention.

FIG. 3 schematically shows the first hydraulic cylinder 6, the second hydraulic cylinder 7 and the first switching valve 29 provided for actuation of the cylinders 6, 7. The first hydraulic cylinder 6 has a first cylinder housing 14. A first piston 16 is connected to a first piston rod 15. First piston 16 is movable within a first cylinder housing 14 so that it may be retracted into or extended from the first cylinder housing 14. The first piston 16 separates the chamber surrounded by the first cylinder housing 14 into a first piston-end cylinder chamber 18 and a first piston rod-end cylinder chamber 20. A first piston-end piston area 17 of the first piston 16 is located towards the first piston-end cylinder chamber 18. A first piston rod-end piston area 19 of the first piston 16 is located towards the piston rod-end cylinder chamber 20.

The second hydraulic cylinder 7 has a piston 23, which is moveable within a second cylinder housing 21. A second piston rod 22 is connected to the second piston 23. The second piston 23 separates the chamber surrounded by the second cylinder housing 21 into a second piston-end cylinder chamber 25 and a second piston rod-end cylinder chamber 27. A second piston-end piston area 24 of the second piston 23 is located towards the second piston-end cylinder chamber 25. A second piston rod-end piston area 26 of the second piston 23 is located towards the second piston rod-end cylinder chamber 27.

The first piston rod-end cylinder chamber 20 of the first hydraulic cylinder 6 is connected to the second piston-end cylinder chamber 25 of the second hydraulic cylinder 7 by means of the line 28. A first switching valve 29 controls the two hydraulic cylinders 6, 7 and has four ports. The first port 30 connects to the pressure supply device P. The second port 31 connects to the hydraulic tank T. The third port 32 connects to the first piston-end cylinder chamber 18 by means of the line 34. The fourth port 33 connects to the second piston rod-end cylinder chamber 27 by means of the line 35.

The first switching valve 29 can be displaced to four switching positions. In the closed position O, the first port 30 is closed off from the pressure supply device P. The second port 31 is closed off from the hydraulic tank T. The third port 32 is closed so that no connection exists to the first piston-end cylinder chamber 18. The fourth port 33 is also closed so that no connection exists to the second piston rod-end cylinder chamber 27.

When the first switching valve 29 is displaced to the position A, the first piston-end cylinder chamber 18 is connected to the pressure supply device P by way of line 34 and ports 30 and 32. Correspondingly, the second piston rod-end cylinder chamber 27 is connected to the hydraulic tank T by way of line 35 and ports 31 and 33. In position A, the first piston-end cylinder chamber 18 is filled and the first piston rod 15 is extended from the first cylinder housing 14. A volume, corresponding to the extension of the first piston 16 out of the first piston rod-end cylinder chamber 20, is displaced. This volume is transported through line 28 to the second piston-end cylinder chamber 25 of the second hydraulic cylinder 7. When the first piston rod-end piston area 19 of the first piston 16 is as large as the second piston-end piston area 24 of the second piston 23, the extension of the second piston 23 out of the second cylinder housing 21, is equal to the extension of the first piston 16 in the first cylinder housing 14. Correspondingly, the two piston rods 15, 22 are extended by the same amount from their cylinder housing 14, 21. To correct the retraction length when leakages appear, a smaller advance of one of the piston rods can be selected, resulting in a different size of the piston-end or the piston rod-end piston area of the hydraulic cylinder.

When the first switching valve 29 is displaced to switching position B, the first piston-end cylinder chamber 18 is connected to the hydraulic tank T by way of line 34 and ports 32 and 31. The pressure supply device P is connected to the second piston rod-end cylinder chamber 27 of the second cylinder housing 21, by way of first port 30, fourth port 33 and line 35. When pressure means, in the form of hydraulic oil flows from the pressure supply device P into the second piston rod-end cylinder chamber 27, a volume proportional to the travel of the second piston 23 is displaced out off the second piston-end cylinder chamber 25. This volume is transported through line 28 to the first piston rod-end cylinder chamber 20 of the first cylinder housing 14. As the first piston rod-end piston area 19 and the second piston-end piston area 24 become of equal size, the retraction of the first piston 16 into the first cylinder housing 14 is equal to the retraction of the second piston 23 into the second cylinder housing 21. A corresponding volume is displaced out off the first piston-end cylinder chamber 18 and transported through line 34, third port 32 and second port 31 to the hydraulic tank T.

The extension of the two piston rods 15, 22 corresponds to a lowering of the two lower steering arms 1, 2 of FIG. 1 and a lifting of the two lower steering arms 101, 102 of FIG. 2.

In addition to the first switching valve 29, a second switching valve 36 is provided. The second switching valve 36 has three switching positions namely G, D, and E. The second switching valve 36 has a total of five ports, namely the ports 37, 38, 39, 40 and 41. In the basic switching position G, all connections except the third port 39 and the fourth port 40 are closed. In position G, the third port 39 and the fourth port 40 are connected to each other so that the line 28 is open. As such, a pressure means exchange between the first piston rod-end cylinder chamber 20 and the second piston-end cylinder chamber 25 can be carried out. As the other ports are closed, the two pistons 16, 23 remain in their respective positions in their respective cylinder housings 14, 21. The fifth port 41 is connected to the second piston rod-end cylinder chamber 27 of the second cylinder housing 21 by a connection line 42 and the line 35.

The second switching valve 36 is connected to the pressure supply device by way of the first port 37. The second switching valve 36 is connected to the hydraulic tank T by way of the second port 38. The second switching valve 36 adjusts one of the two pistons relative to the other piston in order to balance lateral inclinations. This is achieved by transmitting a liquid volume to the second piston-end cylinder chamber 25, thereby displacing a corresponding volume out off the second piston rod-end cylinder chamber 27 to the hydraulic tank T. This balancing operation is carried out when the first switching valve 29 is in the closed position O, and the second switching valve 36 is displaced from the basic position G into the position D.

In position D, the third port 39, which is connected to the piston rod-end cylinder chamber 19 by line 28, is closed. The portion of the line 28 leading from the second switching valve 36 to the second piston-end cylinder chamber 25 is connected to the pressure supply device P by the first port 37 and the fourth port 40. In this position, an oil volume is transported from the pressure supply device P to the second piston-end cylinder chamber 25. A corresponding volume is displaced to the hydraulic tank T from the second piston rod-end cylinder chamber 27 by way of the line 35, the connection line 42, the fifth port 41 and the second port 38. This results in a lowering of the lower steering arm 2 relative to the lower steering arm 1.

When the second switching valve 36 is displaced to the switching position E, the connection between the switching valve 36 and the first piston rod-end cylinder chamber 20, by way of the third port 39, is closed. The portion of the line 28 connected to the second piston end cylinder chamber 25 is connected to the hydraulic tank T by the fourth port 40 and the second port 38. The pressure supply device P is connected to the second piston rod-end cylinder chamber 27 by the first port 37, the fifth port 41, the connection line 42 and the line 35. This connection results in the second piston rod 22 being pushed into the second hydraulic cylinder 7. In reference to the embodiment of FIG. 1, this operation results in a lifting of the lower steering arm 2 relative to the lower steering arm 1 because of the shortening of the second hydraulic cylinder 7.

When an inclination adjustment is carried out and the second switching valve 36 is brought back into the basic position, the two pistons 16, 23 can be synchronously displaced by a corresponding actuation of the first switching valve 29. However, the position difference is maintained in the cylinder housings 14, 21. To cancel the inclination adjustment, the pistons 16, 23 are pushed into or extended from their respective cylinder housings 14, 21 to the maximum end position within the cylinder housings 14, 21.

In addition to the embodiment just described, another embodiment of the present invention is possible. This embodiment includes, in addition to the first embodiment, a floating position for the lower steering arms which allows the lower steering arms to lift and lower independently from each other. To achieve this, the first switching valve 29 is provided with a further (fourth) switching position C. The second switching valve 36 is also provided with a further (third) switching position F.

When the first switching valve 29 is in position C, the first port 30 to the pressure supply device P is closed. The third port 32 and the fourth port 33 are connected to the hydraulic tank T by the second port 31. Therefore, the first piston-end cylinder chamber 18 and the second piston rod-end cylinder chamber 27 are connected to the hydraulic tank T. When the second switching valve 36 is in the switching position F, the first port 37 is closed so that no connection exists to the pressure supply device P. In addition, the fifth port 41 is closed. The two ports 39 and 40 are connected to the hydraulic tank T by the second port 38. This results in a volume exchange from the first piston rod-end cylinder chamber 20 and the second piston-end cylinder chamber 25 to the hydraulic tank T. As a result, the cylinder chambers 18, 20, 25, 27 are connected to the hydraulic tank T.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hydraulic lift device for an attaching device of a tractor, a self-propelled working machine or an implement provided with a hydraulic pressure supply device and a hydraulic tank, said attaching device having two lower steering arms, said hydraulic lift device comprising:

a first double acting hydraulic cylinder for actuating one of the two lower steering arms, said first double acting hydraulic cylinder having a first cylinder housing, a first piston rod and a first piston, said first piston including a first piston-end piston area and a first piston rod-end piston area, said first double acting hydraulic cylinder further having a first piston-end cylinder chamber and a first piston rod-end cylinder chamber;

a second double acting hydraulic cylinder for actuating the other of the two lower steering arms, said second double acting hydraulic cylinder having a second cylinder housing, a second piston rod and a second piston, said second piston including a second piston-end piston area and a second piston rod-end piston area, said second double acting hydraulic cylinder further having a second piston-end cylinder chamber and a second piston rod-end cylinder chamber;

a first switching valve adapted to take up at least three switching positions and comprising a first port representing a connection to the pressure supply device, a second port representing a connection to the hydraulic tank, a third port representing a connection to the first piston-end cylinder chamber of the first hydraulic cylinder and a fourth port representing a connection to the second piston rod-end cylinder chamber of the second hydraulic cylinder;

a line connecting the first piston rod-end cylinder chamber of the first hydraulic cylinder to the second piston-end cylinder chamber of the second hydraulic cylinder, wherein the first piston rod-end piston area of the first hydraulic cylinder and the second piston-end piston area of the second hydraulic cylinder have the same size or a specific predetermined size relationship to each other; and a second switching valve arranged in line between the first piston rod-end cylinder chamber of the first hydraulic cylinder and the second piston-end cylinder chamber of the second hydraulic cylinder, said second switching valve adapted to take up a basic position and at least two further switching positions and comprising a first port to a pressure supply device and a second port to a hydraulic tank, wherein in said basic position the connection to the pressure supply device and to the hydraulic tank as well as to a fifth port to the second piston rod-end cylinder chamber of the second hydraulic cylinder are closed, and wherein a third and a fourth port are open to the line between the first piston rod-end cylinder chamber and the second piston-end cylinder chamber.

2. The hydraulic lift device according to claim 1, wherein said first switching valve further comprises lines for the passage of a pressure means between the first port and the pressure supply device, between the second port and the hydraulic tank, between the third port and the first piston-end cylinder chamber and between the fourth port and the second piston rod-end cylinder chamber.

3. The hydraulic lift device according to claim 1, wherein the first switching valve is able to take up a first switching position in which all of the ports are closed.

4. The hydraulic lift device according to claim 3, wherein the first switching valve is able to take up a second switching position, in which the pressure supply device is connected to the first piston-end cylinder chamber and the second piston rod-end cylinder chamber is connected to the hydraulic tank.

5. The hydraulic lift device according to claim 4, wherein the first switching valve is able to take up a third switching position, in which the pressure supply device is connected to the second piston rod-end cylinder chamber and the first piston end cylinder chamber is connected to the hydraulic tank.

6. The hydraulic lift device according to claim 5 wherein the first switching valve is switchable to a fourth switching position for connecting the first piston-end cylinder chamber and the second piston rod-end cylinder chamber to the hydraulic tank and closing the first port to the pressure supply device.

7. The hydraulic lift device according to claim 1 wherein the second switching valve is switchable to first further switching position, thereby closing the connection to the first piston rod-end cylinder chamber, connecting the second piston-rod-end cylinder chamber to the pressure supply device and connecting the second piston end cylinder chamber to the hydraulic tank.

8. The hydraulic lift device according to claim 7 wherein the second switching valve is switchable to a second further switching position, thereby closing the connection to the first piston rod-end cylinder chamber, connecting the second piston-end cylinder chamber to the pressure supply device and connecting the second piston rod-end cylinder chamber to the hydraulic tank.

9. The hydraulic lift device according to claim 8 wherein the second switching valve is switchable to a third further switching position, thereby closing the first port to the pressure supply device and the fifth port to the second piston rod-end cylinder chamber and connecting the first piston rod-end cylinder chamber and the second piston-end cylinder chamber to the hydraulic tank.

* * * * *

UNITED STATES PATENT AND TRADEMARK OFFICE
CERTIFICATE OF CORRECTION

PATENT NO. : 6,659,192 B2
DATED : December 9, 2003
INVENTOR(S) : Coenen et al.

It is certified that error appears in the above-identified patent and that said Letters Patent is hereby corrected as shown below:

Title page,
Item [57], ABSTRACT,
Line 1, delete "A" and insert -- The invention relates to a --

Column 3,
Line 2, after "volume", insert -- and, therefore, of the same length --
Line 6, after "the", insert -- areas of the --
Lines 24-25, after "Specifically," delete "pressure is exchanged" and insert -- lines are arranged --
Line 46, "end" should be -- rod-end --
Line 54, "rod-end" should be -- end --

Column 10,
Line 6, "first" should be -- a second --

Signed and Sealed this

Fourth Day of May, 2004

JON W. DUDAS
*Acting Director of the United States Patent and Trademark Office*